United States Patent [19]

Metz

[11] 4,171,830
[45] Oct. 23, 1979

[54] VEHICLE SUSPENSION LIFT SYSTEM
[75] Inventor: Stewart N. Metz, Tulsa, Okla.
[73] Assignee: Granning Suspensions, Inc., Dearborn, Mich.
[21] Appl. No.: 882,786
[22] Filed: Mar. 2, 1978
[51] Int. Cl.² ............................................. B60G 11/28
[52] U.S. Cl. .................. 280/711; 267/15 A; 280/704
[58] Field of Search ............... 280/704, 711, 712, 713, 280/81 R, 672; 267/18, 31, 15 R, 22 R, 15 A

[56] References Cited
U.S. PATENT DOCUMENTS

| | | | |
|---|---|---|---|
| 2,974,976 | 3/1961 | Lyall | 280/704 |
| 3,298,706 | 1/1967 | Lyall | 280/81 R |
| 3,390,895 | 7/1968 | Verdi | 267/31 |
| 3,556,554 | 1/1971 | Saward | 280/712 |
| 3,689,102 | 9/1972 | Granning | 280/704 |
| 3,794,344 | 2/1974 | Raidel | 280/704 |

Primary Examiner—Joseph F. Peters, Jr.
Assistant Examiner—John A. Carroll
Attorney, Agent, or Firm—Whittemore, Hulbert & Belknap

[57] ABSTRACT

The vehicle suspension provides an axle assembly which may be mounted either on a truck-tractor or a truck-trailer to provide an additional axle. The suspension includes an axle which is suspended from a vehicle frame by means of a spring structure. A drawbar extends forwardly from the axle to connect the axle to the vehicle frame. A lifting mechanism is provided to raise the axle and associated wheels off the ground when desired.

7 Claims, 5 Drawing Figures

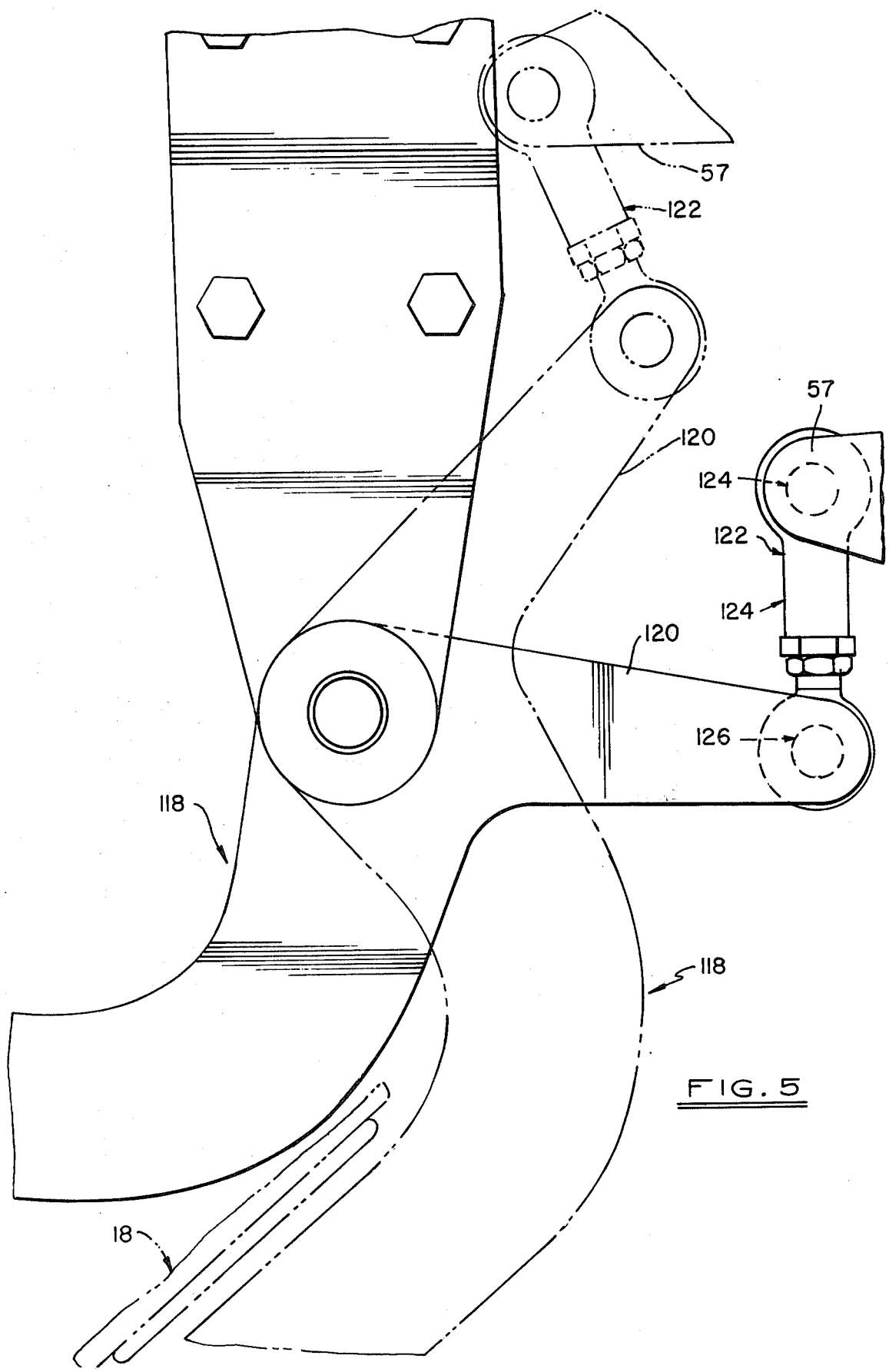

VEHICLE SUSPENSION LIFT SYSTEM

BACKGROUND OF THE INVENTION

It is frequently desirable to add an additional axle assembly to a truck-tractor or trailer to increase the load carrying capacity of the vehicle. The maximum permissible load for each wheel of the truck is regulated by state law. If additional wheels are provided on the truck, the permissible truck load is increased thus permitting the trucker to haul a larger payload. In addition to complying with loading regulations, it is also desirable to add an extra axle when the load is to be increased in order to prevent undue wear on the vehicle.

The present invention provides an axle assembly which may be mounted on a truck to provide the desired additional axle. A novel lifting arrangement is provided to lift the axle off the ground when there is no load on the vehicle thus saving tire wear and engine fuel. The lifting structure is very compact in design so as to fit into the relatively small space which is frequently available for mounting the axle assembly.

SUMMARY OF THE INVENTION

The suspension is for a vehicle having a frame. It comprises a suspension support structure separate from the vehicle frame. The suspension support structure is of a size and includes structure for mounting thereof on the vehicle frame. An axle is provided along with a pneumatic spring structure therefore securable between the vehicle frame and the axle to resiliently support the axle. A drawbar extends outwardly from the axle towards the forward end of the suspension support structure. Pivotable fastening means secures the drawbar to the suspension support structure. A lifting assembly is provided for the axle. This assembly comprises a lift structure securable to the vehicle frame and a lever structure pivotably connected to the vehicle frame and extending from said lift structure into connection with the axle to lift the axle upon inflation of the inflatable structure.

IN THE DRAWINGS

FIG. 5 illustrates a modified structure for connecting the lift structure to the axle assembly.

The vehicle suspension lift system includes angle-shaped members 10, 12 which are bolted to a pair of spaced-apart vehicle frame channel members 14, 16. A pair of pneumatic structures 18, 20 are suspended from members 10, 12 by means of brackets which are welded thereto. The structures 18, 20 are of conventional design and each comprises a pair of flexible air bags. The bags have upper and lower metallic reinforcing discs vulcanized thereto and a center disc vulcanized to the bags to join them together. A conventional pneumatic circuit (not shown) is associated with each structure to supply the bags with the desired amount of air under pressure for inflating or deflating the bags. In the present invention, the bags are used to lift or lower the axle. This is accomplished by increasing the pressure within the bags as will be hereinafter explained.

Figure 4:
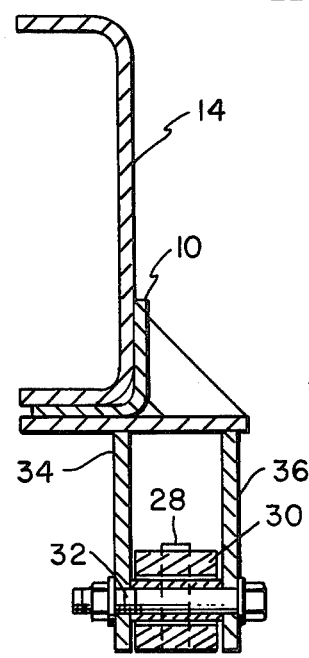
FIG. 4 is a sectional view taking substantially along the line 4—4 of FIG. 1 looking in the direction of the arrows.

A bracket structure 22, 23 is also suspended from each member 10, 12 rearwardly of each structure 18, 20. The bracket structures serve to pivotably support bell-crank structures 24, 25. Each bell-crank structure includes a forwardly extending arm section 26 from which extends, at approximately right-angles, upwardly extending arm section 28. As best seen in FIG. 4, the arm section 28 is secured to a sleeve 30 as by welding. The sleeve 30 has a central opening therethrough and is pivotably mounted onto bolt structure 32 which extends between bracket elements 34, 36. A rearwardly extending arm section 38 is also secured to the sleeve 30 as by welding to complete the crank assembly.

Axle assembly 40 is located rearwardly of the arm section 38 and is positioned therebeneath. Vehicle wheels 42 are rotatively mounted on the axle assembly. An element 44, 46 is provided above the axle assembly. The axle is received in recesses in elements 44, 46 and welded thereto. Each element 44, 46 has an upwardly extending portion 48 and a rearwardly extending portion 50. A bolt structure 52 is provided at the upper end of portion 48 in sliding engagement with wear plates 54, 56 which are secured to the vehicle channel members. The bolt structures 52 guide the axle in its up and down movement. This structure is adjustable to provide for wear which results from the sliding contact.

An arm section 57 extends forwardly from each portion 48 of the elements 44, 46 to a position over rearwardly extending arm section 38 of the bell crank. A clevis 58 is secured to the rearward end of bell crank arm section 38 in order to maintain the two arm sections in close proximity. The forward end of bell crank arm section 26 is secured to the lower portion of the pneumatic structures by means of bolts.

Figure 1:
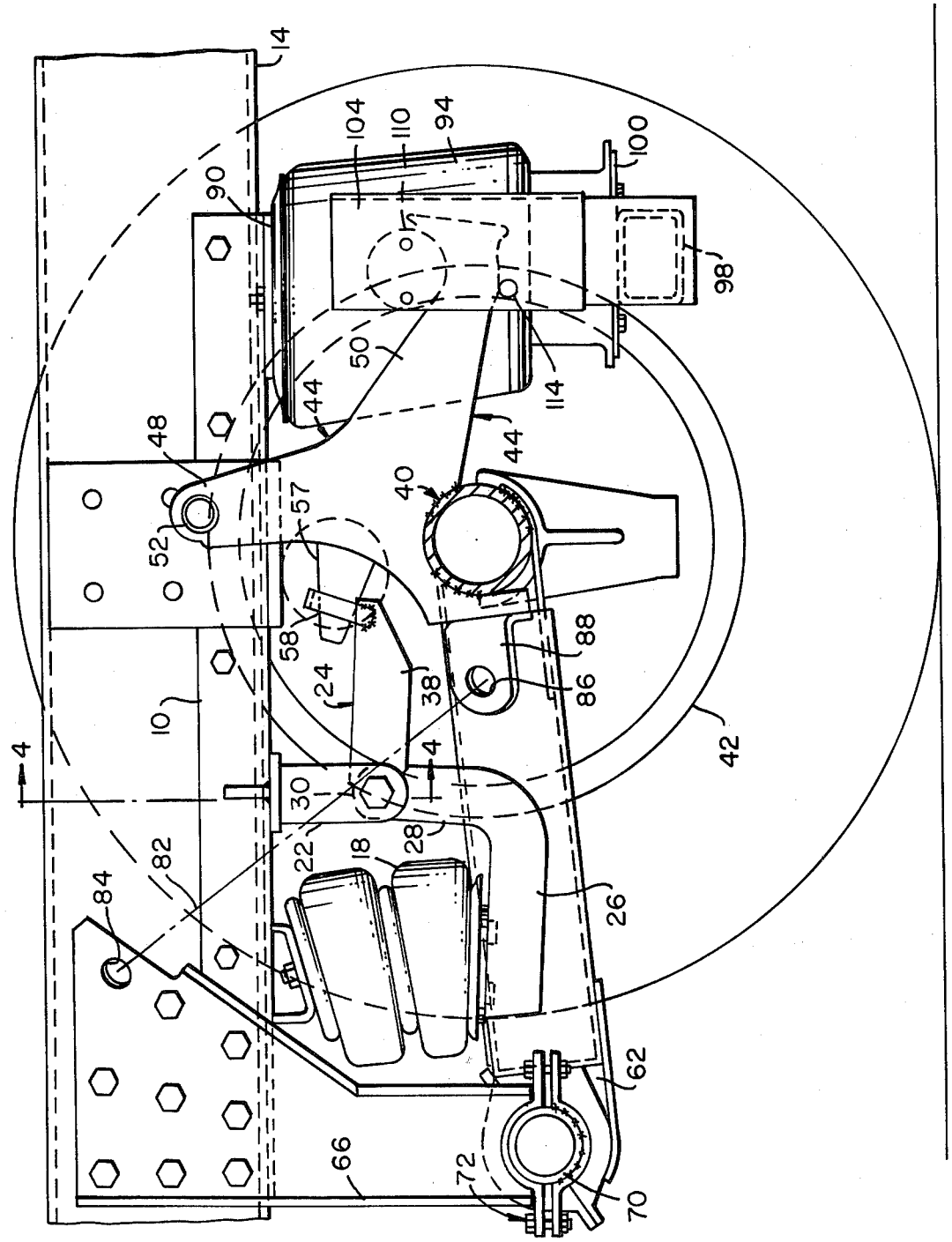
FIG. 1 is a side elevational view of one embodiment of a vehicle suspension lift system in accordance with the present invention with the axle in the down position.
Figure 2:
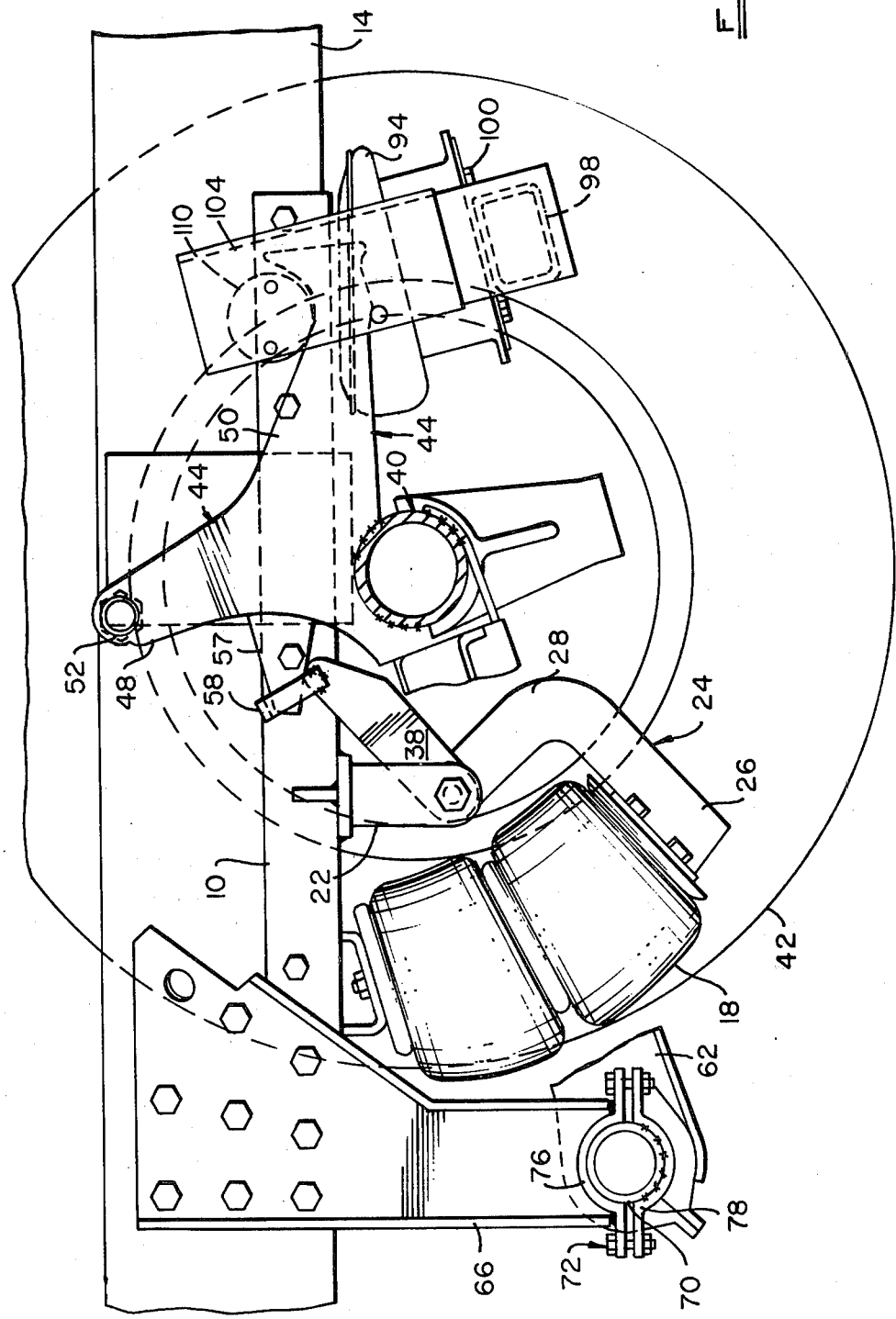
FIG. 2 is a view similar to FIG. 1 illustrating the axle in the retracted position.
Figure 3:
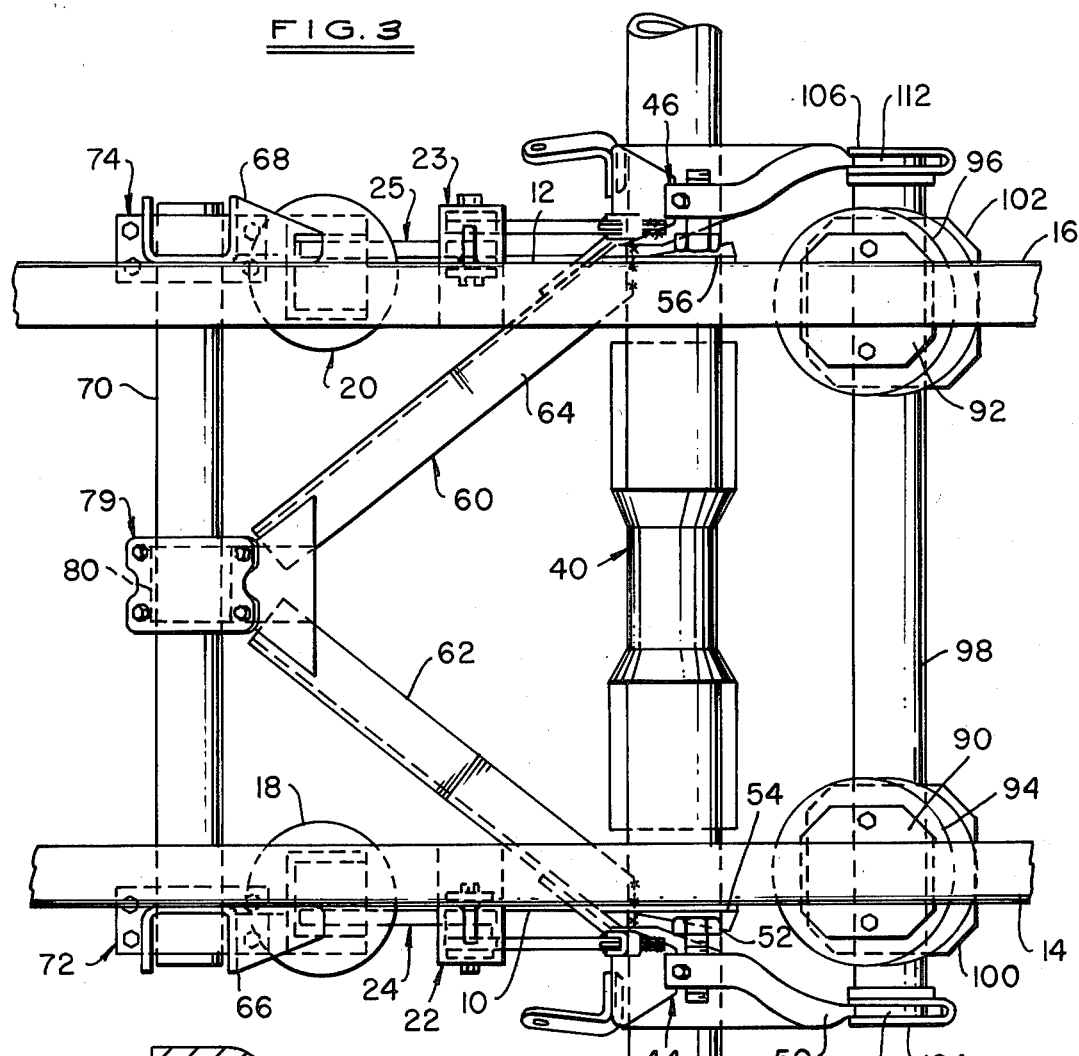
FIG. 3 is a plan view of the vehicle suspension lift system of FIG. 1.

When the pneumatic structures 18, 20 are as in FIG. 1, they are deflated and allow the axle assembly 40 to assume the down position as shown. When it is desired to retract the axle assembly and attached wheels from contact with the ground, the pneumatic structures are inflated with higher air pressure whereupon they will expand, as shown in FIG. 2, in an arc to cause pivoting of the bell crank structure 24 and consequent lifting of the axle assembly 40 as illustrated in FIG. 2 to a position where the wheels are off the ground. This lifting results from the contacting point of bell crank arm section 38 against arm section 57 which results in lifting of the entire axle assembly. In essence, the contact point of the two arm sections forms a floating pivot point, the position of which changes during upward movement. It should be noted that the axle assembly moves in an arc forwardly from the position of FIG. 1 to that of FIG. 2, this movement being more pronounced by noting the initial position of bolt structure 52 and the final position thereof. The overall structure as thus shown and the arc-type movements which result from the interaction of the parts is very compact in nature thus permitting actuation of the entire unit in a very small space which is restricted in size by other components of the vehicle such as, for example, the vehicle transmission and propshaft.

The axle assembly 40 is pulled by means of structure located forwardly thereof. The axle assembly is attached to a drawbar structure 60. The drawbar structure includes inwardly converging legs 62, 64 which extend from welded points of attachment adjacent the outer ends of the axle into connection with each other at a point centrally located with respect to the axle to thus define a V-shaped configuration when viewed in plan. A pair of downwardly extending support members 66, 68 are bolted to the vehicle frame. A cylindrical support member 70 extends between the lower ends of member 66, 68. Couplings 72, 74 having upper members 76 welded to members 66, 68 and lower members 78 bolted to the upper members is provided for support of support member 70. Member 70 is welded to each lower member 78 and then the lower members are bolted to the upper members 76.

The drawbar is secured to support member 70 by coupling 79. The coupling member 79 is a resilient coupling to permit pivoting thereof in response to up and down movement of the axle. A resilient sleeve 80 is provided within the coupling. The resilient sleeve permits the outer end of the drawbar structure to pivot about a transverse axis a slight degree upon a rise or fall of the axle. The sleeve 80 also permits a slight amount of tilting about the longitudinal axis, thus accommodating axle pivoting about a horizontal axis defined by the drawbar and axle. Whenever the axle is moved out of its normal position, the sleeve 80 urges it back toward the normal position and will reposition the axle upon cessation of the force thereon. However, the sleeve 80 does not result in the device tending to strongly seek a center position.

Shock absorbers, represented by the dotted line 82 in FIG. 1, are desirably provided mounted between opening 84 and opening 86 of bracket 88. Such shock absorbers serve the usual function of shock absorbers.

The spring means for the suspension system will now be described. A pair of brackets 90, 92 are bolted to the truck frame rearwardly of the axle assembly 40. A pneumatic spring 94, 96 is connected at the upper end to the underside of each bracket. A transversely extending tubular support element 98 extends between and beyond the springs 94, 96. A flat horizontal plate 100, 102 is secured to the element 98, as by welding, beneath each of the springs. The lower portion of the springs is bolted to plates 100, 102. An upwardly extending anchor element 104, 106 is provided at each outer end of the transverse element 98. The anchor elements 104, 106 are U-shaped and receive the rearwardly extending portion 50 of the elements 44, 46. A cylindrical locator element 110, 112 is provided above each of the portions 50 and is received in a curved recess. The elements 110, 112 are bolted in place. Another bolt 114 is provided beneath the end of each portion 50 to thereby hold these elements in place. The surface of the portion 50 is curved to thereby permit limited pivoting. As will be appreciated, the structure described connects the axle to the springs 94, 96 to thereby provide a resilient suspension for the entire assembly.

Operation of the springs 94, 96 is conventional. Air under pressure is supplied when the axle moves down in use so that constant pressure is maintained thereagainst. Air is exhausted from the springs when the axle rises.

Conventional control means (not shown) are provided for this purpose. When it is desired to lift the axle and wheels off the ground, pneumatic structures 18, 20 are inflated and air springs 94, 96 are exhausted so that they may collapse as shown in FIG. 2.

Instead of pneumatic structures 18, 20, coil springs may be used. Such springs will collapse when air springs 94, 96 are inflated and will cause the axle assembly to be lifted when air springs 94, 96 are exhausted.

FIG. 5 illustrates another means for connecting bell crank 118 to element 57. As thereshown, arm section 120 is connected to structure 57 by means of a double ball joint 122. This structure includes an adjustable shank portion 124 having a ball connection 124, 126 to each element 57, 120. This results in permanent connection of the elements, a true rotating motion with reduced friction and compensation for misalignment of elements 57, 120 and for difference in the basic frame width of the vehicle.

Having thus described my invention, I claim:

1. The combination with a vehicle frame, of an auxiliary axle, means supporting said axle on said frame for pivotal movement about a horizontal axis located in spaced relation to said axle longitudinally of said frame, resilient means between said frame and said axle to assist in the support of said frame when under load, lifting mechanism for lifting said axle to elevated position with respect to said frame when not under load, said lifting mechanism including a pressure device mounted on said frame between said pivotal supporting means and said axle, and a lever pivoted on said frame between said pivotal supporting means and said axle and attached to said pressure device for transmitting force from said pressure device to said axle to lift said axle as aforesaid.

2. The combination defined in claim 1, wherein said axle is connected to said lever by means including a sliding, pivotal connection.

3. The combination defined in claim 1, wherein said axle is connected to said lever by means including a double ball joint.

4. The combination defined in claim 1, wherein said lifting machanism comprises air bag means.

5. The combination defined in claim 4, wherein said air bag means is capable of traveling in an arc centered on the pivot axis of said lever during expansion and contraction thereof.

6. The combination defined in claim 1, including a guide on said frame, and means on said axle in sliding engagement with said guide to guide the movement of said axle to and from elevated position.

7. The combination defined in claim 1, including guide means on said frame, said axle having a member projecting radially therefrom, said member having a first arm operatively connected to said lever, a second arm operatively connected to said resilient means, and a third arm having means in sliding engagement with said guide means to guide the movement of said axle to and from its elevated position.

* * * * *